April 1, 1941.  J. J. LARMOUR  2,237,152
METHOD OF INLAYING ARTICLES
Filed Nov. 21, 1938  2 Sheets-Sheet 1
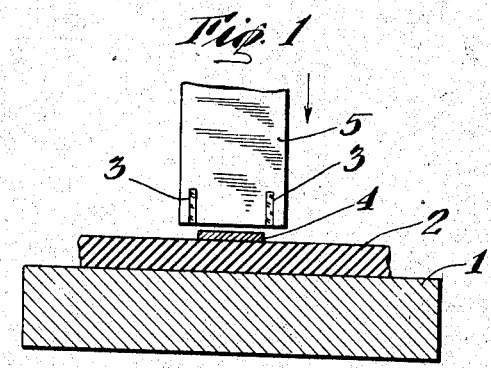
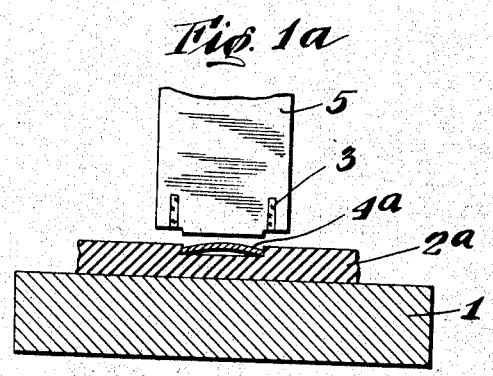
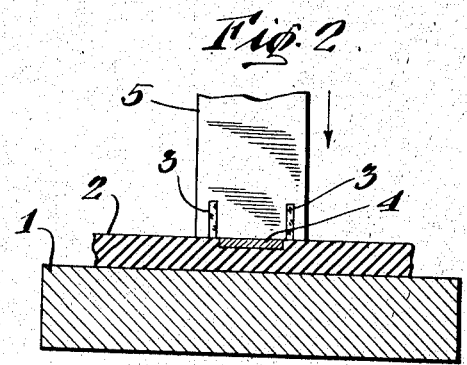
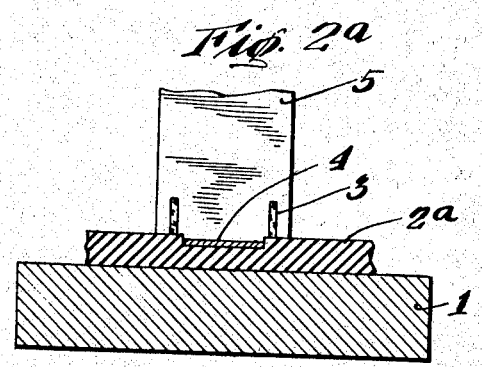
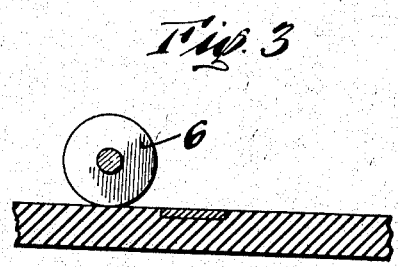
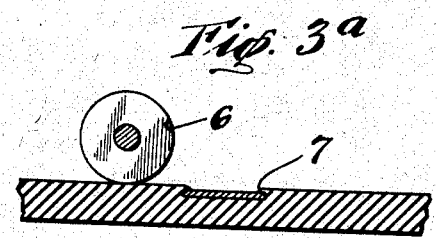
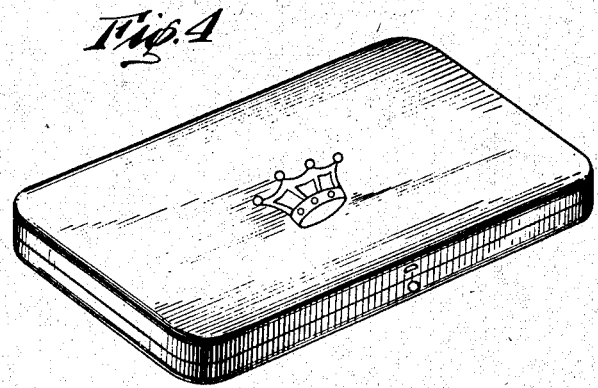
INVENTOR
*James J. Larmour*
BY
*Norman L. Holland*
his ATTORNEY April 1, 1941.  J. J. LARMOUR  2,237,152
METHOD OF INLAYING ARTICLES
Filed Nov. 21, 1938  2 Sheets-Sheet 2
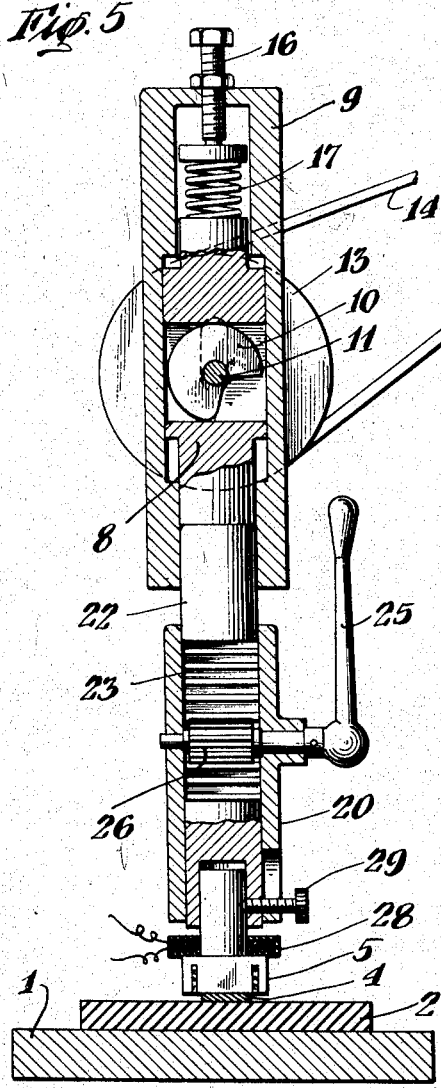
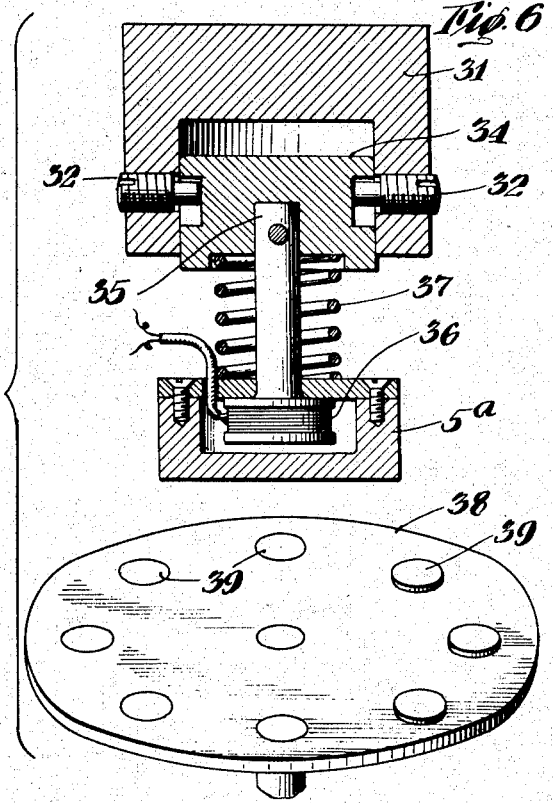
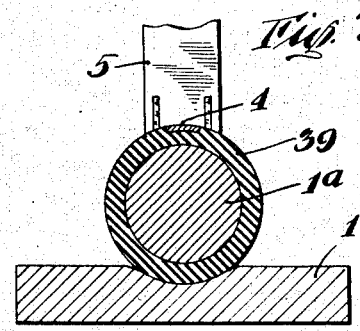
INVENTOR
James J. Larmour
BY
Norman N. Holland
his ATTORNEY Patented Apr. 1, 1941

2,237,152

UNITED STATES PATENT OFFICE 2,237,152

METHOD OF INLAYING ARTICLES

James J. Larmour, East Orange, N. J., assignor to Plastic Inlays, Inc., Summit, N. J., a corporation of New Jersey Application November 21, 1938, Serial No. 241,564

11 Claims. (Cl. 41—35)

The present invention relates to inlaying and more particularly to an improved method of inlaying.

The present method of inlaying ornaments in the surface of articles is generally by engraving the surface to conform to the shape of the article being inlaid and thereafter securing the inlay in the engraved recess. The time required for engraving depends upon the design of the article and in all cases is a comparatively expensive operation, in so far as labor is concerned. Special methods of securing the inlay in the recess are required to prevent loss of the inlay during use of the article. In some cases, attempts have been made to secure an inlay in position by heating the entire article until it becomes plastic and thereafter embedding the inlay therein. Such a method is likewise expensive in that considerable time is required to heat and soften the article. In many cases, the articles are too large to lend themselves to such a process, for example, it would not be feasible to soften a Kodak case or to thus inlay a portion of it. In other cases, the article is likely to lose its shape during the softening operation and reshaping is necessary. Where the inlay is secured in the recess by application of pressure there is a tendency for the edges of the recess to crack or chip off, thereby marring the appearance of the article. This is especially true in articles molded from phenolic condensation and urea compounds.

The present invention aims to overcome the above difficulties by providing an improved, inexpensive method of inlaying articles, particularly articles made from synthetic resin compounds. The method in one aspect eliminates the time and expense of forming a recess preparatory to the inlaying. Where preformed recesses are used, it eliminates or minimizes cracking and chipping of the material at the edges of the recess.

An object of the present invention is to provide an inexpensive method of inlaying articles, particularly articles made of synthetic resins.

Another object of the present invention is to decrease the time and labor required in inlaying articles.

Another object of the present invention is to increase the security of the grip between the article inlaid and the ornament.

Another object of the present invention is to eliminate the necessity for engraving the surface of an article in the inlaying operation.

Another object of the present invention is to eliminate the chipping of the edges of the recess where an inlay is secured in a recess.

Another object of the present invention is to simplify the embedding of inlays in articles made from synthetic resins.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is an elevational view, partly in section, illustrating an article about to be inlaid;

Fig. 1a is an elevational view, partly in section, illustrating an article with a preformed recess about to be inlaid by the present method;

Fig. 2 is an elevational view, partly in section, illustrating the mechanism after the ornament has been inlaid in the article;

Fig. 2a is similar to Fig. 2, except that the ornament has been depressed below the upper surface of the inlaid article;

Fig. 3 is a diagrammatic view, illustrating a tool for reshaping the inlaid article adjacent the edges of the inlay;

Fig. 3a is similar to Fig. 3, showing the tool effective upon an inlay, the upper surface of the inlay being shown in slightly exaggerated form below the surface of the article;

Fig. 4 illustrates the inlay applied to a completed article, it being understood that the inlay may be applied to articles generally;

Fig. 5 is a view, partly in section, illustrating the preferred mechanism for practicing the method, and more particularly for tapping the inlay and forcing it into position in the article being inlaid;

Fig. 6 is a view, partly in section, of a modified type of mechanism for practicing the method; and Fig. 7 is a sectional view, partly in elevation illustrating the invention applied to a hollow article such as a pen barrel or a pen cap, to illustrate the application of the invention to hollow articles generally.

Referring to the drawings, and more particularly to Figs. 1 and 2, there is illustrated a preferred mechanism for practicing the method, it being understood that the invention is not limited to the mechanism shown. A suitable anvil or support 1 is utilized for holding the material 2 to be inlaid. For convenience, a slab of material is shown to illustrate the application of the invention to various types of articles. A thin ornament 4, preferably of metal, is laid upon the material 2 and may, if desired, have on its lower surface an adhesive for securing it in position, although the adhesive is not necessary. The adhesive, if used, may be of the type which softens and becomes effective when heat is applied to it. Such adhesives form very secure attachments and may be utilized herein to hold the inlay in position before it is embedded in the material, and also to increase the adherence of the inlay to the article after it has been embedded and additionally secured in position. It is to be noted that the surface of the article 2 in Fig. 1 has not been engraved, the inlay being applied to a plain surface. The application of inlays in preformed recesses by tapping is shown in Fig. 1a and will be described later.

A pressing member 5 is mounted directly above the inlay and has associated with it heating means for heating it to any desired temperature, and power means for forcing it towards the anvil 1. The member 5, while in heated state, is forced against the ornament 4 which is preferably made of metal and quickly assumes the temperature of the member 5. To minimize dissipation of heat from the pressing member 5 to the atmosphere and to assist in retaining the center portion at a desired temperature, the outer portions are preferably insulated from the center by means of recesses 3 carrying an asbestos or other heat insulating filling material. The common form of plastic made from synthetic resins is comparatively hard in its cold state, but may be softened by being raised to relatively low temperatures, that is, to temperatures in the order of 200 to 300° Fahrenheit. However, certain types of materials may require a higher or lower temperature. As the heat of the member 5 is communicated through the metal ornament 4 to the article 2, there is a localized softening of the surface of the article 2, the softened portions being confined substantially to the size and shape of the ornament to be inlaid. As heat and pressure are applied to the ornament, it embeds itself into the surface of the article, as shown more particularly in Fig. 2, which illustrates the completion of the embedding operation.

If desired, the lower end of the pressing member 5 may conform to the ornament 4 and may press the ornament sufficiently far into the article 1, that the upper surface of the ornament is below the upper surface of the article, as shown more particularly in Fig. 2a. Any irregularity or difference in the surface level is minimized by the subsequent burnishing operation about to be described. The increased depth of the inlay gives greater security and minimizes any chances of accidental removal of the inlay. In order to further secure the inlay in position and to minimize any irregularities occasioned by the embedding operation, the surface of the article is preferably burnished by a suitable roll mill 6 or by any other device. The burnishing roll polishes the article and removes any irregularities and is preferably operated so that the material of the article to be inlaid is forced toward the inlaid ornament. In this way, the material will be forced firmly against the edges of the ornament and to some extent over the marginal edges thereof. This is particularly true where the depth of the recess is greater than the thickness of the ornament, as shown at 7 in Fig. 3a.

For illustrative purposes, an ornament in the form of a crown (Fig. 4) is shown inlaid in a blank. It will be understood that any suitable shape of ornament may be utilized for inlaying, and that it may be applied to various types of articles so long as the material of the article is suitable for inlaying.

While any desired device may be utilized for applying heat and pressure to the member 5, a preferred form of device, having extraordinary advantages, is illustrated in Fig. 5. It will be noted that, in addition to applying heat and pressure, the device in Fig. 5 taps the ornament, that is, embeds it in the article by means of a series of impacts. Preferably, the tapping or series of impacts is utilized in all cases and is particularly helpful in inlaying very thin materials or those of a brittle nature, such as phenolic condensation products or urea compounds. The tapping greatly facilitates the embedding operation and prevents cracking or breaking off of pieces of material. Referring to Fig. 5, there is shown a hollow casing 9, which may be held upright or in other convenient position by any suitable supporting means (not shown). Reciprocably mounted within the hollow casing is a hammer or tapper member 8 which may be reciprocated longitudinally within the hollow casing by a cam 10. The cam is preferably mounted on a shaft 11 which is rotated by a pulley wheel 13 driven by a belt or chain 14. An electric motor or other suitable power source (not shown) may be utilized to drive the belt 14 and pulley 13. An adjusting screw 16 may be utilized to regulate the compression of a spring 17 which presses against the upper end of the tapper member 8 and thus regulates the force or pressure stored by the cam 10 and applied by spring 17 to the hammer 8.

Generally, it is desirable to hold the member 5 against the inlay member 4 during the tapping operation. To accomplish this a hollow plunger or sleeve 20, preferably fixed to a suitable support (not shown) carries the electrically heated pressing unit 5 adjacent one end thereof, the pressing unit being pressed against the ornament 4 to be inlaid in the plastic article 2. A plunger or shaft 22, having teeth 23 thereon similar to a gear rack, is adapted to be adjusted by means of the meshing gear or pinion 26 operated by the handle 25 on the shaft of the pinion 26 secured to the hollow sleeve 20 to move the member 22 up or down. There may be thus maintained at all times a substantnally constant pressing force against the ornament while the tapping is preformed. If desired, pressure for inserting the inlay may be applied without the the tapping but pressure and tapping are preferred.

The pressing member 5 is preferably heated electrically by a heating unit 28 extending about a portion thereof and located within a recess therein. The pressing member may be releasably secured to the member 22 by a set screw 29.

The above described tapping mechanism is capable of delivering 1,800 taps per minute and approximately 50 to 75 taps is sufficient to set an inlay into an ordinary plastic article.

While the above description relates to inlaying an article by displacing the material thereof with heat and pressure without previously forming a recess therein, the present means of tapping may be used to advantage with or without the application of heat for securing inlays in preformed recesses. For example, as shown in Fig. 1a, a curved metal inlay 4a may be placed in an article 2a having a recess therefor and the member 5 utilized for flattening the member 4a to cause the edges thereof to engage the sides of the recess. Thereafter the inlay may be burnished as shown in Figs. 3 and 3a. By using a tapping mechanism such as shown in Fig. 5 and described above, cracking and chipping of the edge of the recess is minimized and substantially eliminated.

In Fig. 6 there is illustrated a preferred type press which may be used where straight pressure is required, that is, without tapping. The reciprocable chuck 31 of a suitable pressing machine (not shown) has secured thereto by means of set screws 32 a base member 34. A rod 35 secured at one end thereof to the base member 34 and provided with an electrical heating unit 36 carries a spring 37 adapted to retain in extended position the pressing member 5a. If desired, the heating unit 36 may be placed in a recess at the outside of the pressing member 5a instead of inside as shown in Fig. 6. The mechanism illustrated in Fig. 6 is particularly adapted for use with a dial machine wherein a dial 38 revolves to progressively present articles 39 to the mechanism. Also, materials such as acetate synthetic resin compounds are particularly adapted for use with the mechanism of Fig. 6, for with such plastics greater pressure may be used with less danger of breakage. Any desired pressure may be obtained for pressing an ornament into an article by utilizing a spring 37 possessing the desired resistance.

In Fig. 7, the invention is shown applied to a cylindrical article 39, which may, for example, be a pen barrel or a pen cap, it being understood that the invention is applicable to any type of hollow article as well as to articles which are not hollow. A suitable anvil 1a is inserted within the cylindrical barrel and the article may be additionally supported by the support or anvil 1. However, it will be understood that the support 1 is not necessary as the anvil 1a is amply sufficient for all purposes. The inlay 4 is applied to the surface of the article, as described in connection with Fig. 1, and the pressing member 5 likewise embeds it into the article, as described hereinbefore. After the embedding operation, the surface of the article may be burnished as illustrated and described in connection with Figs. 3 and 3a.

It will be seen that the present invention relates to an improved and simplified method of inlaying articles. It eliminates the necessity for engraving the surface of the article, which reduces the amount of labor and the amount of time required for securing the inlay in position. In addition, by eliminating the necessity for engraving, a greater variety of shapes of ornaments may be utilized without a substantial increase in the cost of the articles or in the tools required for making the articles. The inlays are securely held in position, if desired, by three different means, namely an adhesive, the embedding operation, and the burnishing operation. Loss of inlays during use of the articles is, therefore, reduced to a minimum. The method is equally applicable to various shapes and types of objects so long as they are made of suitable material and may also be advantageously applied in securing inlays in preformed recesses. Unskilled labor may be used in practicing the method, thereby further decreasing the cost of the articles.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of inlaying articles molded from a synthetic resin compound which comprises heating the surface of the article being ornamented through the intermediation of the ornament being inlaid, and tapping said ornament during the heating operation to force it against the surface of the article to embed it therein.

2. The method of inlaying articles molded from a synthetic resin compound which comprises supporting the article to be inlaid, pressing a thin ornament made from a material harder than the material of said article against the article until the ornament is embedded in the surface of the article and forcing portions of the article adjacent the edges of the ornament over the edges of the ornament to further secure the ornament in position.

3. The method of inlaying articles molded from a synthetic resin compound which comprises embedding an ornament in the article until the upper surface of the ornament at the edges thereof is below the upper surface of the article, and forcing the material of the article over the edges of the ornament to hold the ornament securely in position.

4. The method of inlaying articles molded from synthetic resins and the like which comprises supporting the article to be ornamented, heating a pressing member and utilizing said heated pressing member to press a thin ornament against the article until the ornament is embedded in the surface of the article, and forcing the material of the article over the edges of the ornament to eliminate irregularities and to further secure the ornament in position.

5. The method of inlaying articles made from plastic materials which comprises supporting the article, heating a pressing member, oscillating said pressing member, and causing it, during the oscillations, to tap an ornament against the surface of the article until the ornament is embedded in the surface of the article.

6. The method of ornamenting hollow articles having smooth outer surfaces, which method comprises inserting a supporting member within the hollow article, heating the surface to be ornamented through the intermediation of the ornament being inlaid, and pressing said ornament against the supporting surface of the article to embed it therein, and forcing parts of said article over the edges of the ornament to further secure the ornament in place.

7. The method of inlaying ornamental members in articles molded from plastics which method comprises positioning the ornamental member on the article and tapping the ornamental member to cause it to interlock with the article.

8. The method of inlaying ornamental members in articles molded from plastics, which method comprises providing a recess in the plastic article, positioning a dished metal member in the recess, heating a pressing member, and oscillating the pressing member so as to tap the metal member to flatten it and to cause it to engage the sides of the recess and embed therein.

9. The method of inlaying articles molded from a synthetic resin compound, which comprises providing a recess in the article, having a greater depth than the thickness of the ornament, with the ornament therein and reshaping the edges of the recess to force the material of the article over the edges of the ornament to hold the ornament in position.

10. The method of inlaying articles molded from a synthetic resin compound, which comprises forming a recess in the article having a greater depth than the thickness of the ornament, placing the ornament therein, and reshaping the edges of the recess to force the material of the article over the edges of the ornament to interlock the ornament in the recess.

11. The method of inlaying articles molded from a material such as a synthetic resin compound, which comprises forming a recess in the article adapted to receive an ornament, placing an ornament in the recess and reshaping edge portions of the recess to force the material of the molded article against the ornament to hold the ornament in the recess.

JAMES J. LARMOUR.